United States Patent
Mendez Rodriguez et al.

(10) Patent No.: US 11,902,745 B2
(45) Date of Patent: Feb. 13, 2024

(54) SYSTEM OF PROCESSING DEVICES TO PERFORM AN ALGORITHM

(71) Applicant: JACOTI BV, Wevelgem (BE)

(72) Inventors: Nun Mendez Rodriguez, Tenerife (ES); Amaury Hazan, Barcelona (ES); Nicolas Wack, Barcelona (ES); Kamil Budzynski, Barcelona (ES); Jacques Kinsbergen, Antwerp (BE)

(73) Assignee: JACOTI BV, Wevelgem (BE)

( * ) Notice: Subject to any disclaimer, the term of this patent is extended or adjusted under 35 U.S.C. 154(b) by 5 days.

(21) Appl. No.: 17/767,331

(22) PCT Filed: Oct. 9, 2020

(86) PCT No.: PCT/EP2020/078499
§ 371 (c)(1),
(2) Date: Apr. 7, 2022

(87) PCT Pub. No.: WO2021/069715
PCT Pub. Date: Apr. 15, 2021

(65) Prior Publication Data
US 2022/0377469 A1 Nov. 24, 2022

Related U.S. Application Data

(60) Provisional application No. 62/912,873, filed on Oct. 9, 2019.

(51) Int. Cl.
*H04R 25/00* (2006.01)
*H04R 29/00* (2006.01)

(52) U.S. Cl.
CPC .......... *H04R 25/502* (2013.01); *H04R 29/00* (2013.01)

(58) Field of Classification Search
None
See application file for complete search history.

(56) References Cited

U.S. PATENT DOCUMENTS 10,292,626 B2  5/2019  Coninx
2010/0040248 A1  2/2010  Shridhar et al.
(Continued)

FOREIGN PATENT DOCUMENTS

EP  3343953 A1  4/2018

OTHER PUBLICATIONS

International Search Report and Written Opinion from corresponding PCT Application No. PCT/EP2020/078499, dated Dec. 22, 2020.

*Primary Examiner* — Mark Fischer
(74) *Attorney, Agent, or Firm* — Workman Nydegger (57) ABSTRACT

A system comprising a plurality of processing devices is arranged for performing an algorithm having a plurality of computational tasks. The plurality of processing devices are interconnected with each other. A control logic module is adapted to select an implementation of the algorithm among a plurality of implementations. At least a part of the control logic module resides in one of the processing devices and the implementation is selected according to at least one criterion of (latency requirements, computational power, resource availability, data locality, privacy requirements, precision requirements, hardware capabilities, distance, location, acoustical performance requirements, energy efficiency, orientation) and in the selected implementation the plurality of computational tasks of the algorithm is distributed over at least two of the processing devices.

15 Claims, 3 Drawing Sheets

(56) References Cited

U.S. PATENT DOCUMENTS

| | | |
|---|---|---|
| 2013/0223664 A1 | 8/2013 | Meskens et al. |
| 2013/0343584 A1 | 12/2013 | Bennett et al. |
| 2015/0381425 A1 | 12/2015 | Kansal et al. |
| 2018/0276039 A1 | 9/2018 | Boesen |

SYSTEM OF PROCESSING DEVICES TO PERFORM AN ALGORITHM

FIELD OF THE INVENTION

The present invention is generally related to the field of systems containing a plurality of portable processing devices arranged to carry out an algorithm together.

BACKGROUND OF THE INVENTION

Consumer devices such as smartphones and headsets play an important role in the life of most people nowadays. These devices provide sufficient computational power and capability to handle complex audio processing. There is a wide range of devices on offer, from budget-friendly solutions to high end products. It was estimated that in 2015 only for the Android operating system, more than 24000 different device models were available.

Recently a new type of devices, called smart headsets, is hitting the market. Smart headsets are technically advanced, electronic in-the-ear devices designed for multiple purposes ranging from wireless transmission to communication objectives, medical monitoring and so on. Smart headsets combine major assets of wearable technology with the basic principles of audio-based information services, conventional rendition of music and wireless telecommunication. In order to be able to handle a variety of complex audio tasks, smart headsets contain tiny but powerful processing units. Such processing units are, in most cases, only able to provide processing in fixed point arithmetic.

It is estimated that around 466 million people suffer from a disabling degree of hearing loss. Consequently, it cannot surprise that a considerable amount of research about hearables is dedicated to aiding the hearing impaired.

A first assessment a given person can make to gain some insight on his/her degree of hearing loss is to have an audiogram performed. An audiogram is a representation of a person's hearing compared to the average young normal hearing person. The currently dominant solution on the market is to visit a specialist, who can assess the degree of hearing loss by means of specialized hearing equipment.

After such assessment the particular hearing characteristics of the user can initially be compensated for by adjusting parameters that affect that audio processing. These adjustments as a function of frequency, called fitting, can range from a small amplification to very high levels of amplification. Sometimes, for a given user having substantially different levels of hearing loss at different frequencies, a large range of required amplification levels can be found.

Recently, pure software solutions have emerged that run for example in a smartphone and allow taking a self-test, resulting in an audiogram and an estimation of the user's degree of hearing loss.

In order to have these software solutions run on consumer hardware a number of requirements has to be met. One requirement is compliance with medical standards and regulations. Further they need to be acoustically calibrated. Previous consumer solutions have relied on a fixed combination of smartphone and analog headset. However, this limits both the power of the solution and the widespread adoption of such technologies, as only a small subset of the available devices on the market is able to support this.

In scenarios as sketched above the computational tasks to be executed (e.g. when implementing a given algorithm, for example an algorithm to determine hearing loss levels and to calculate parameter settings to compensate the hearing loss) may be quite demanding. Given the available processing devices there may be many ways to perform the required tasks. Several limitations can come into play, one of them being computational capabilities of the processing device in the system.

Recent developments in the field of audio headset have led to a new type of smart headset called True Wireless. These devices comprise two independent devices, with their own processing units that communicate with the smartphone to play audio.

Although the above examples relate to ear-level audio processing devices, it is immediately clear that also in system of processing devices intended for use in other application fields, may be faced with exactly the same issues.

Hence, there is a need for a system comprising one or more processing devices, whereby the system is capable of managing the available resources to perform tasks required to execute an algorithm in a smart, adaptive way.

SUMMARY OF THE INVENTION

It is an object of embodiments of the present invention to provide for a communication system comprising a plurality of processing devices wherein an algorithm can be performed according to a number of possible implementations and wherein smart resource management is applied to select the implementation to be used.

The above objective is accomplished by the solution according to the present invention.

In a first aspect the invention relates to a system comprising
a plurality of processing devices arranged for performing an algorithm comprising a plurality of computational tasks, said plurality of processing devices being interconnected with each other,
a control logic module adapted to select an implementation of said algorithm among a plurality of implementations, wherein at least a part of said control logic module resides in one of said processing devices and wherein said implementation is selected according to at least one criterion of {latency requirements, computational power, resource availability, data locality, privacy requirements, precision requirements, hardware capabilities, distance, location, acoustical performance requirements, energy efficiency, orientation} and in the selected implementation said plurality of computational tasks of said algorithm is distributed over at least two of said processing devices.

The proposed solution indeed allows for spreading the execution of the computational tasks of the algorithm to be performed over two or more of the processing devices of the system according to a selected implementation among a set of possible ways to implement. The selection of the implementation actually used for performing the algorithm takes into account one or more criteria as indicated. This allows for smart resource management. For each computational task of the algorithm a processing device is selected that given the constraints and requirements is best suited. The choice of which criteria are taken into account may vary depending on the use case.

In preferred embodiments one of the processing devices is an ear-level audio processing device and another of the processing devices is a further portable computing device or a cloud computing service. The ear level audio processing device is preferably arranged for noise monitoring and/or sound generation.

In some embodiments the ear-level audio processing device is a hearing aid.

In preferred embodiments the control logic module is distributed over the plurality of processing devices.

Advantageously at least one of said processing devices comprises a graphical user interface.

In one embodiment output produced by performing a computational task of the plurality of computational tasks in a first processing device can be received as input data in at least two other processing devices of the plurality of processing devices.

In a preferred embodiment the control logic module can assign a computational task of the algorithm simultaneously to two different processing devices of the plurality.

Advantageously, selecting the implementation is performed based on a weighted sum of two or more of said criteria. In some embodiments the weights of the weighted sum are determined by interrogating one or more of the processing devices.

In some embodiments the control logic module is arranged to steer a data stream in or to processing devices of the system by using a command from a set of commands.

In embodiments of the invention selecting the implementation is performed on the fly.

In another embodiment the criterion of hardware capabilities allows choosing between an implementation of the algorithm using signal values in a floating-point representation and an implementation of the algorithm using signal values in a fixed point representation.

In one embodiment, in the selected implementation with said fixed point representation numbers representing a gain to be applied to signal values are normalized by subtracting a maximum gain value from said gain and limiting said signal values to a given negative threshold. Preferably the given negative threshold equals the negative of the maximum gain value.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention generally relates to a system comprising a plurality of devices capable of running one or more algorithms. Running an algorithm implies carrying out a number of computational tasks. The devices thereto may comprise one or more conventional components like a digital signal processor (DSP), a central processing unit (CPU), possibly a multi-core CPU, and optionally memory. The processing devices may be external to one another (e.g. not integrated, hence physically separated). The processing devices are in connection with each other so that communication between them is possible. The connection may for example be a wireless link, e.g. a Bluetooth communication link, or a wired link. The processing devices are each able to perform one or more, optionally even all, of the computational tasks of the algorithm to be run. A key component of the system is a control logic module. The control logic module is typically implemented in software. This module decides on how an algorithm is carried out, in other words how the execution of the various computational tasks of the algorithm is spread or distributed between the various processing devices of the system. This decision involves the selection of one of a set of possible implementations of the algorithm in question. In some embodiments the selection of the implementation to be used is made on the fly.

In embodiments of the system of the invention one or more of the processing devices may comprise input and/or output transducers. This may be in particular advantageous in applications where audio signals are involved. For example, hearing devices typically include a set of input and output transducers, for instance microphones and speakers. Input acoustic transducers, e.g. microphones, convert an acoustic signal, i.e. variations of the sound pressure level (SPL), into electrical signals which are then sampled by an analog-to-digital converter (ADC) and converted in the digital domain. Other transducers such as microelectromechanical systems (MEMS) can convert SPL variation into a digital signal without the need for an external ADC. In a similar fashion, acoustic output transducers, e.g. loudspeakers, coupled with a digital-to-analog converter, can convert a digital signal into variation of the SPL.

In advantageous embodiments of the system according to the invention at least one of the processing devices is an ear level audio processing device. The term ear level audio processing device is used in this description to refer to any device that, when in use, resides at ear-level and comprises at least one audio output and some means for standalone processing (e.g. a DSP and/or a CPU). The device is further in this description sometimes called ear-level processing device or ear-level computing device. In what follows a smart Bluetooth headset is used as current example of an ear level audio processing device. The invention is however in no way limited to this single example. Instead of an ear level audio processing device a wrist level processing device, e.g. a smartwatch, can be used. Another example of an ear-level audio processing device may be a hearing aid.

In a particular ear level audio processing device, it may be desired to run advanced control processes of the audio parameters, e.g. a noise reduction algorithm that makes use of deep neural network analysis. However, current central processing units (CPUs) and digital signal processing (DSP) in ear level computing devices cannot cope with the high workloads that come along with such an approach. This invention discloses in some embodiments a system comprising the ear level computing device wherein such high requirements can be dealt with due to the presence of one or more other processing devices.

The present invention generally capitalizes on applying what can be referred to as smart resource management, whereby for example in a scenario with high computational complexity at least a part of the required computational burden is offloaded from one processing device to at least one further suitable, for example computationally more powerful, processing device belonging to the considered communication system. As another example, a scenario is considered where a computational task is offloaded from a computationally more powerful processing device to a less or equally powerful processing device, e.g. from a smartphone to an ear-level processing device. This may be advantageous e.g. in scenarios where data locality or latency constraints are most critical. As another example, the instantaneous availability of a given processing device of the system may not be guaranteed, so that the control logic module has to select another implementation wherein one or more of the computational tasks are offloaded from that given processing device to one or more other processing devices. It is advantageous that the decision on which processing device to use for performing a certain task of the algorithm is taken on the fly, so that the conditions at the very moment of executing can be considered.

Such a further processing device can for example be any portable computing device like a laptop, smartphone, tablet, smartwatch or the like or a cloud service running over the internet.

In some embodiments the control logic module is fed by input data. Said input data can represent, for example, an audio signal, a location, an image, interaction by the user or other. It is to be noted that these inputs can be gathered via any of the processing devices present in the system, using techniques which are as such well known to the skilled person. These include e.g. capturing sensors, files in a file system, streams of data over the Internet and so on.

In this description control logic refers to a set of software instructions to control the system and the application it is part of. It controls a sequence of operations to be executed by the computational and memory components of the system. Control logic may react in response to commands received from a user, but it can act also on its own to perform certain tasks. Control logic can be modelled by means of a state diagram. The control logic module maps a current state to a next state. In some embodiments also time is considered as a parameter in the mapping process. The control logic module monitors a set of parameters, e.g. indicating characteristics of the processing devices, and takes a decision on which actual implementation to use of an algorithm to be run so that the execution of the algorithm is optimized in terms of the given requirements for a given use case. Additionally, the control logic module may change the way the decision-making process is performed, for example by adjusting one or more other parameters used when taking the decision. The monitoring and optionally adjusting can in some embodiments be performed for example at fixed, possibly regular, time intervals. In other embodiments continuous or quasi-continuous monitoring and adjusting can be applied.

In an embodiment of the system the control logic is non-distributed. In such case all control logic resides in just one of the processing devices. In other embodiments the control logic module is implemented in a distributed way in various components (i.e. processing devices) of the system, whereby control logic instructions for each component are grouped in what is sometimes referred to as control logic blocks.

Preferably, the total computational load gets distributed over the constituent components of the communication system taking into account one or more of latency requirements, computational power, resource availability, energy and energy efficiency, data locality, privacy requirements, precision requirements, distance, location, hardware capabilities, acoustical performance requirements, etc.

Latency in the context of this invention relates to the total time needed for the system to produce its output from the time of emission of a stimulus signal, including the time of propagation of the sound wave. Latency requirements may for example be or become important as soon as a microphone is switched on in one of the processing devices of the system. In other situations, e.g. when a speaker is a certain distance away, latency conditions may be more relaxed, such as when talking via the phone.

Computational power may be expressed in terms of memory and/or processing requirements. E.g., when it is required to run a deep neural network algorithm to infer some value, it may not be possible to run such algorithm with enough precision in one or more of the processing devices, e.g. in an ear level audio processing device. Offloading the computational load or at least a part thereof to one (or more) of the further processing devices of the system may then offer a way out.

Also, energy efficiency can be considered. Energy efficiency refers to the total energy required to perform a certain task within the system. For example, the system may perform a task more efficiently if the ear level processing device does not need to send data wirelessly to another device of the system, which may be more suitable if sending wireless data were not necessary.

Data locality refers to the access of a system with distributed computational power capabilities to its various inputs. Consider for example, a use case where a smart headset is comprised in the system and a smartphone is the or one of the further processing devices of the system. If one has to process image input, one may prioritize processing in a device in the system which has a camera (the smartphone), whereas if one has to perform a measurement of, e.g., heart rate, one may choose the headset (i.e. the ear level device), as it is typically in constant contact with the user's body.

Privacy requirements may be at play when, for example, sending data to a cloud service. In such case the user of one of the processing devices of the system may prioritize local processing and keep its data in the own device.

Hardware capabilities may be expressed in terms of the data types available to represent numbers (signal values) a processing device may process. For example, a CPU may have a floating-point unit or only be able to perform integer arithmetic.

Precision requirements refer to the ability to carry out a calculation with greater precision in one device than in another. For example, one of the processing devices may only have enough computational power to run an algorithm at a limited precision, thus not achieving the optimal performance of said algorithm. One or more other processing devices in the system on the contrary may be capable of solving the same problem with greater precision; thus, they may be preferable over the device that can offer only a limited precision.

Energy requirements refer to the limited capacity of devices to sustain a given performance without draining their battery too much. For example, a processing device with low battery may try to offload as much computation as possible, to save energy and last longer.

Location requirements refer to the physical location of the represented input data of an algorithm or of the processing device itself. For example, the distance to a person whose voice a device is processing can play a role in deciding whether or not to use the processing device.

Distance requirements refer to the physical distance between a point of interest and one of the processing devices in the system. For example, it may be desirable to give priority in handling tasks of the algorithm to be performed to the device which is at the shortest distance to a particular point of interest or subject.

Orientation requirements refer to the azimuth between a processing device and a point of interest. This type of requirement may indicate, as an outcome, that some device is better oriented to perform an algorithm or a computational task thereof than another (e.g., in order to measure noise a control logic may pick the device whose microphone is best faced to the source of noise).

Acoustical performance requirements refer to the characteristics of transducers comprised in the processing devices in terms of frequency response, dynamic range, total harmonic distortion, noise floor, polar pattern etc. Acoustical performance may be affected by the positioning of microphones relative to the source of interest and of interfering sources. For example, in an ear-level device one microphone can be used after performing adaptive noise cancellation (ANC), whereas another microphone may be used before. So, different use cases might choose different microphones. As a further example, the selection of a microphone (of thus the use of the processing device comprising that microphone) can be dependent on occlusion detection.

In some embodiments of the invention the control logic module takes decisions on how to perform the various computational tasks, i.e. how to distribute the computational load over the available resources when actually executing the algorithm, based on a weighted sum of the above-mentioned requirements related to latency, computational power, resource availability, data locality, privacy, precision, acoustic performance, hardware capabilities, orientation etc. The weights used in the sum may be predetermined for a given use case. Requirements which are not considered in the sum obviously have a zero weight. In some embodiments determining the weights may involve an interrogation of the various processing devices by the control logic module in order to be aware of their capabilities in the given use case. This may be advantageous for example when a new processing device is added to the system. Weights can be expressed as constant values or as a function of one or more parameters, e.g. time, location or orientation. This allows the weights to change dynamically, thereby also changing the decision process. The weights in this approach are pre-set given a particular use case. The use case is inputted to the control logic and may be provided by user choice, location, AI methods or other. The input data for determining the weights comes from each particular device, which, given its particular conditions and characteristics, has a certain capability. The device that scores the best and is available, may be chosen to perform the particular task.

In certain embodiments the control logic module may be used to assign, match and schedule one or more computational tasks to be performed simultaneously to the processing devices that score best, e.g. in a weighted sum approach. These embodiments allow using more of the available resources present in the system.

The weighted sum approach can be used to identify the suitability score of a processing device of the system given a specific use case. For example, and most typically, the processing device with the highest score is selected. Weights involved in the weighted sum can be manually set or be the result of an optimisation process using machine learning or artificial intelligence techniques applied to a training data set. The training data is based on a collection of device characteristics and suitability scores, from which the weights are computed using an optimisation technique such as stochastic gradient descent (SGD) or backpropagation.

In some embodiments the weighted sum can be replaced, as a more generic extension, by a more complex operation defined by weights, such as Artificial Neural Networks (ANN). In this case, provided the above-mentioned training data based on a collection of device characteristics and suitability scores is supplied, the weights of the artificial neural network can be computed.

A training step may be performed to compute suitable weights based on human-annotated training data using a supervised machine learning approach. This means the weights are fixed when executing the trained weighted sum model. In a further extension, during execution of that model, the weights may be further updated using unsupervised or reinforcement machine learning approaches.

In the case of a variety of computational tasks to be performed in parallel, the tasks are ordered by priority, then an iteration over the tasks is performed and the best processing device is selected according to the procedure running in the control logic module. After each task is assigned to a processing device, that device may for example be marked as busy and ignored for subsequent decisions until the task ends if they cannot handle more than one task at a time.

The control logic module so provides an indication on which part of the system is to perform a certain computational task of the algorithm to be executed. For example, for a feedback/echo canceller algorithm a weighted sum of precision and latency requirements may be expressed. The weights for other requirements are set to zero. Suppose that in this example two different implementations are available of how the algorithm can be executed. In the first implementation the algorithm is run with a high degree of precision, but significant latency is added to the processing. In the second implementation the algorithm is run with less precision, but with a low enough latency. For this particular example of a use case, the control logic module comprises non-zero weights for the latency and precision requirements, as already mentioned. For example, when the algorithm is applied in a phone call, the control logic module may weight precision higher than latency. On the other hand, when the algorithm is applied in a hearing-aid mode the control logic module may weight latency as the highest of the parameters. When tagging the audio source type and comparing the performance of the available implementations, the control logic module can use a weighted sum approach to determine that phone calls should run feedback/echo canceller in the first implementation, whereas hearing-aid mode should run the feedback/echo cancelled in the second implementation.

Figure 1:
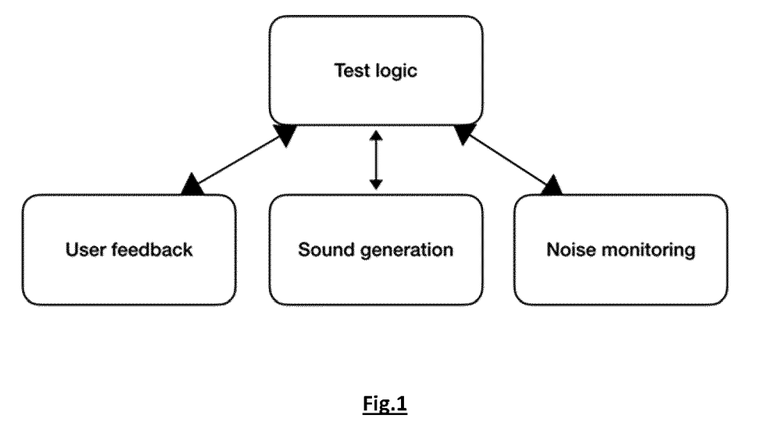
FIG. 1 illustrates a basic functional block scheme to perform a self-administered hearing test.

As already indicated above, in a preferred embodiment of the system of the invention one of the processing devices is an ear level audio processing device. Another processing device of the system is for example a smartphone or another portable computing device. A possible use case is then a scenario wherein a user needs to perform a self-administered hearing test by means of the ear level audio processing device. In such a test some form of audiometry is performed by running on e.g. the smartphone an algorithm whereby sounds are generated to determine hearing thresholds of a given user. On the ear level audio processing device an algorithm is run for noise monitoring. FIG. 1 illustrates a functional block scheme of a set-up for a hearing test. By test logic is understood in this case the series of logical steps to follow to converge a series of tone intensities to the threshold of hearing of the user. It is this test logic that acts based on the input of at least user feedback, current state of the test, etc.

The hearing thresholds may be determined by presenting a certain stimulus to the user and receiving some feedback from the user to indicate whether the stimulus was heard or not. One way to organize such a hearing test may be as follows. A pure tone audiometry method is conducted to measure the test person's capability to identify tones of a different frequency. This is especially important in the frequency range between 500 Hz and 4 kHz as this is the frequency range of normal conversation. Pure tone audiometry therefore is a key hearing test used to identify hearing threshold levels of an individual person, enabling determination of the degree of a hearing loss of different frequencies. For example, the hearing threshold level might be 0 dB at 500 Hz, corresponding to normal hearing sensitivity, but 60 dB at 4 kHz, corresponding to a hearing loss of 60 dB.

One method to perform pure tone audiometry is a subjective measurement of the hearing threshold relying on the patient's response to the pure tone stimuli. Therefore, this approach is only used on adults and children old enough to cooperate with the test procedure. Calibrated audiometry headphones are typically used, sounds are presented by using a pure tone audiometer whereas a tone is presented by the test leader and the test person is expected to respond to this by pushing a button, raising the hand, giving a voice signal or, for children, by performing an action in a play situation (play audiometry in children). A quality of the assessed pure tone thresholds, i.e. the lowest level heard by the patient, not only depends on the reliability of the test person's responses, but also very strongly on the competencies and experience of the test leader.

Another method to carry out the pure tone audiometry method has been described in U.S. Pat. No. 10,292,626 B2, which is hereby incorporated by reference. In that approach tones of at least two different frequencies are applied in the same test run, integrated in different test stimuli, in addition to a test stimulus with "no tone at all". For example, three different test stimuli may be used: a test stimulus comprising a single long tone of a first frequency, a set of three short tones with a second frequency and, as mentioned, nothing at all. The second frequency is always higher than the first frequency. For example, one starts by presenting to the test person a long tone with a frequency of 500 Hz and an intensity of e.g. 60 dB. The test person is then informed that a response is expected to the presented stimulus. Then after a short delay automatically a next stimulus is presented, which is randomly selected among the three above-mentioned options. If the response to the previous stimulus was correct and unless the next selected stimulus is the 'no tone at all' option, the next stimulus signal has the same frequency as the previous stimulus but a lower intensity, e.g. 10 dB less. If, however, the response to the previous stimulus was wrong, the intensity is increased. In this way for each frequency the lowest intensity hearable by the test person can be determined.

In such use case an algorithm is required to monitor the noise while a set of stimuli is being presented, so as to ensure that the stimuli are not being masked by surrounding noise. The monitoring may be performed continuously or not continuously, e.g. only at fixed, possibly regular, time intervals. To provide feedback on the presented stimuli a feedback loop can be created comprising e.g. one or more of a graphical user interface of a portable computing device, a gesture recognition of a portable computing device, a motion control device, such as a camera and/or voice. Some exemplary embodiments are described below.

Figure 2:
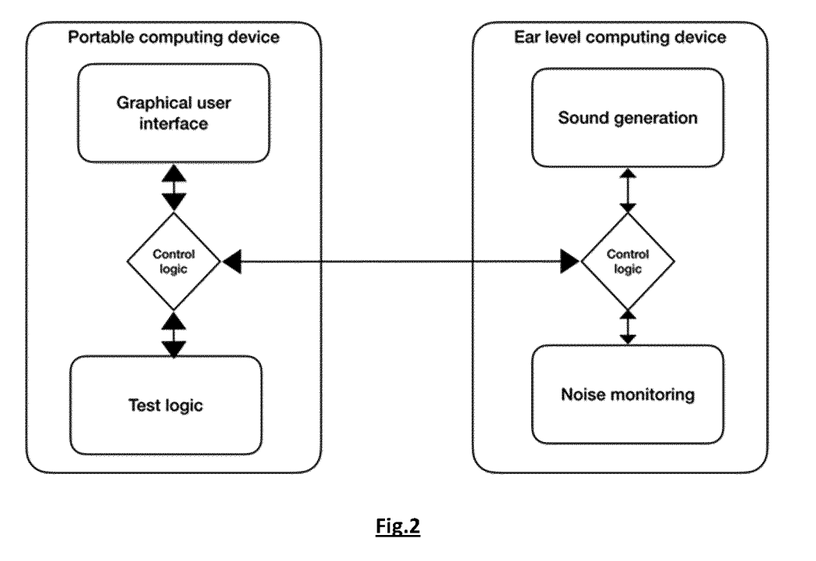
FIG. 2 illustrates an embodiment of a mechanism to distribute the decision-making process between an ear level computing device and a portable computing device.

In case a processing device, e.g. a portable computing device, is provided with a graphical user interface, the user can provide feedback to the test logic used by the algorithm by, e.g., pressing buttons or moving sliders. This feedback is treated as input to the control logic module. In such case the control logic block in the portable computing device receives information on noise, possibly in a continuous way. These noise values together with the user interface actions are used as inputs to the control logic module, which can then determine the hearing thresholds. The noise analysis is preferably run within the ear level computing device. The ear level computing device may also be provided with a sound generation component. In another processing device, e.g. a portable computing device, a feed of the noise is analysed, e.g. constantly or at regular time instants, and the sound generation component in the ear level device is steered. FIG. 2 provides a block scheme illustration of this embodiment. FIG. 2 also illustrates that the control logic is distributed. The set of control instructions related to tasks performed in the portable computing device is kept separate from those required in the ear level audio computing device. The ear-level device takes care of the noise monitoring, while the noise analysis is performed in the portable computing device. The tone selection is dealt with in the portable computing device and the actual tone generation occurs in the ear level device, which is optimal for audio quality preservation as well as for time accuracy reasons. The control logic uses weight constraints to select which device performs the abovementioned tasks. For example, the tone generation task is run on the ear level processing device because it scores best in terms of data locality, time accuracy and data quality constraints.

Figure 3:
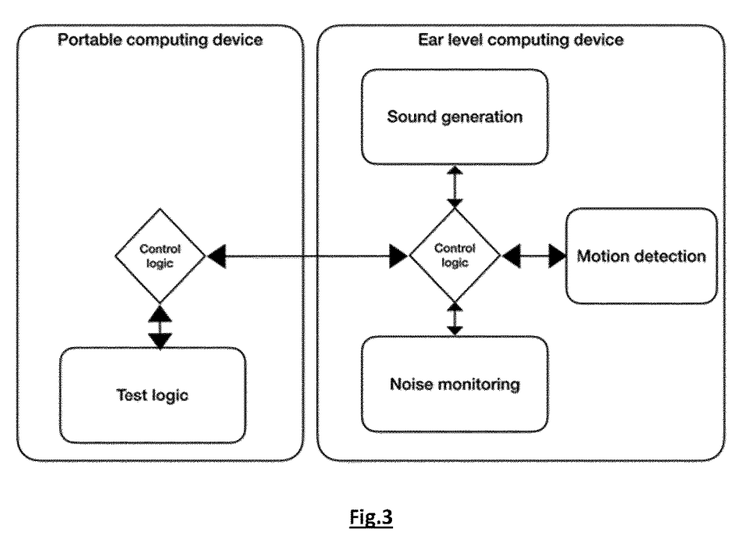
FIG. 3 illustrates a gesture-based feedback detection hearing test, whereby a user feedback is captured by means of head gestures.

In case a processing device, e.g. a portable computing device, is capable of gesture recognition, a user may tilt the head e.g. in a predetermined direction or make certain kind of gestures to provide feedback to the portable computing device. In such case the control logic block in the ear level computing device is arranged to perform a noise analysis and to generate a sound. Control logic running in a portable computing device steers the sound generation component in the ear level computing device based on inputs indicative of noise and gesture, plus, optionally, additional inputs (e.g. a user profile comprising e.g. information on age, gender, . . . ) coming from local or remote devices, such as a web service. FIG. 3 provides a block scheme illustration of this embodiment. Also here the control logic module is implemented by means of a plurality of distributed control logic blocks.

Figure 4:
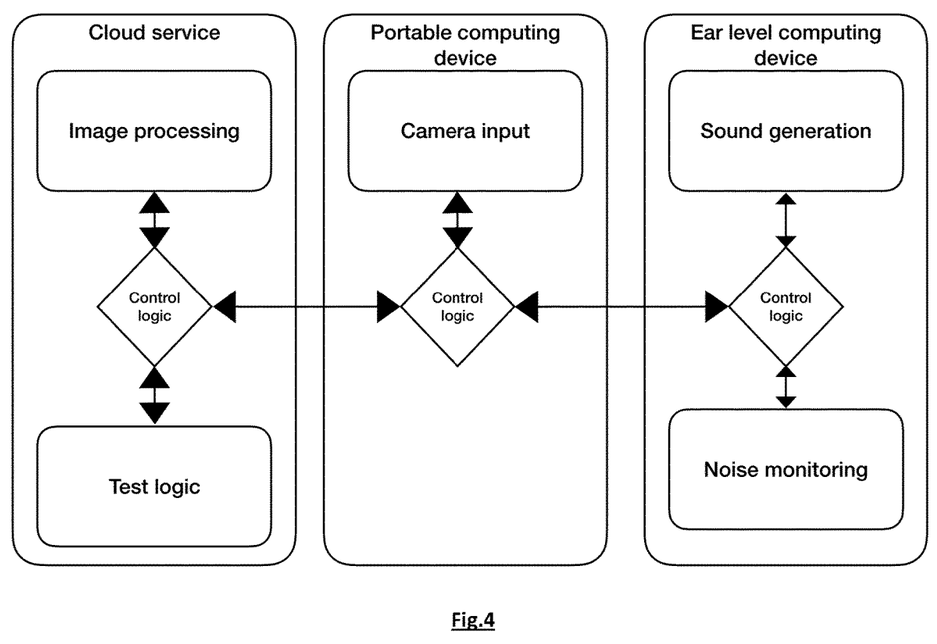
FIG. 4 illustrates an embodiment of a mechanism to distribute decision making and processing between three different devices. Ear level, portable and cloud service, whereby user feedback is detected by means of a camera and image processing algorithms.

FIG. 4 illustrates a scenario wherein a system with an ear level computing device and two further processing devices is considered. A camera is used in the feedback loop, a portable computing device captures the user's behaviour. The portable computing device is then for example a smartphone or a tablet or laptop. Feedback decisions can then be made based on gestures (e.g. head motion) or other physical reactions observable in the received images that may be cause of the stimuli being heard. In the embodiment illustrated here image detection may be performed in a cloud service (here seen as another processing device of the system), while noise monitoring and sound generation are performed within the ear level computing device. The portable computing device is arranged to transmit the data required for performing the image detection to the cloud. A block of control logic instructions located in the portable computing device manages the inputs from the portable computing device to steer the image detection and sound generation. The implementation selected by the control logic module indicates for each computational task of the algorithm to be run and given the specific constraints which processing device will handle that task. For example, the image capturing is selected to be done in the portable computing device for data locality reasons. Cloud service is chosen to perform the processing for performance reasons, while the sound generation is performed on the ear-level device which has the audio output for data quality and time accuracy reasons. FIG. 4 provides a block scheme illustration of embodiments like the ones just described.

A discrete set of commands may be implemented as a preferred way to steer the data stream coming from the inputs from the various processing device to the control logic module. One example may be a command to control with the portable computing device the frequency and intensity of a tone generated in the sound generation component. Another example may be the spectral profile for a given time window detected while monitoring the noise.

Exploiting processing components running in different devices forming part of the communication system provides unique advantages and capabilities, leveraging more powerful computing devices to offload calculations that would otherwise be impossible to perform. This holds in particular for the field of audio processing.

In another embodiment one of the processing devices, for example an ear level computing device, may be running an independent control logic module, with all its instructions, inputs and tasks being run within said processing device. Such a secondary (independent) control logic module does not have any connection or knowledge of the other (main) control logic module, even when control logic blocks of the main control logic module may be present on the ear-level device. The secondary control logic module may only be used to perform specific tasks envisioned for that particular processing device. Taking the example of a system with an ear level computing device, a hearing loss compensation algorithm may be steered via a portion of the control logic instructions residing in the ear level device, which comprises inputs of various microphones, user's location, audio source type and beacons that can identify spatially objects of interest.

It is to be noted that some algorithms run by the system may be performed locally in the ear level audio processing device as a way of latency optimization, while other algorithms where latency is not a vital factor, may be offloaded from the ear level audio processing device. For example, an automatic gain control module may run one analysis for fast protection of sudden changes locally in the device. A more sophisticated and accurate analysis may be offloaded to a portable computing device, overriding the first analysis in certain cases.

In the abovementioned example of the self-administered hearing test, the noise monitoring is controlled locally in the ear level processing device present in the system, as it may require time-accurate analysis that would be otherwise difficult to perform. However, a second, more accurate microphone can provide additional input to the control logic module which may affect the decision on how to implement the noise monitoring algorithm. For example, the more accurate microphone can perform detailed noise profile analysis during the whole test but without the highest time-accuracy, while ear-level noise monitoring provides a time-accurate result but with lower resolution. Both can contribute useful information for control logic in determining hearing threshold.

Obviously, the system of the invention can equally be applied in use cases outside the domain of hearing tests. The general idea behind the invention can be applied to any distributed decision making (or distributed control logic) process. For example, other application fields may be, but are not limited to, environmental noise tracking, user sound exposure tracking, user behaviour, physical parameters tracking and hearing loss compensation.

Furthermore, one or more portions of the control logic module in the proposed system may be optional, and only useful for augmentation purposes. Such an embodiment is discussed next.

Figure 5:
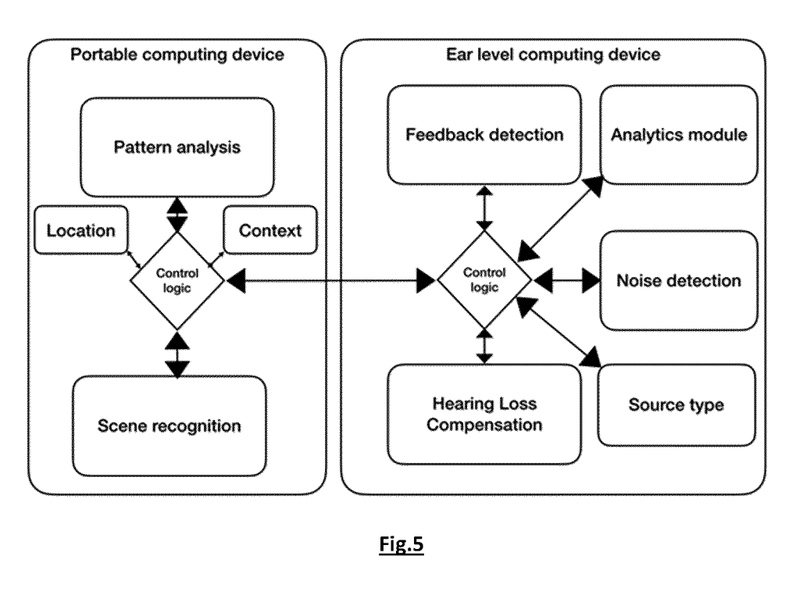
FIG. 5 illustrates the use of distributed control logic processing for controlling real-time parameters of a hearing loss compensation algorithm.

An ear level computing device which provides hearing loss compensation processing may run a first control logic block which is able to process the inputs locally present. Additional control logic blocks of the distributed control logic module may establish connection to the first control logic block to augment its input set and provide additional control over the hearing loss compensation when present. For example, a first control logic block may be running in an ear level device to provide hearing loss compensation parameter adjustment based on the inputs from noise detection, acoustic feedback detection, prior history, and the type of source (e.g., music being streamed in). This suffices to provide standalone functionality to the ear level device. However, when paired to an additional control logic block (e.g., on a portable computing device), the system gains real-time knowledge about additional inputs such as location, scene analysis, more complex noise reduction algorithms, etc. A control logic block with more resource consuming control logic can be run in a portable computing device which allows for a more sophisticated processing of the hearing loss compensation parameter adjustment. Additionally, machine learning techniques, e.g. running on a cloud service, can be used for analysis of these parameters and user behaviour and for further tuning listening parameters. An illustration is found in FIG. 5.

In one embodiment the system may be comprised of two ear-level processing devices and a smartphone. In such scenario, a three-way communication exists between the control logic blocks of the control logic module that can decide which computational task of an algorithm should be performed by which device. The key feature in this embodiment is that multiple devices may need to process a same task in parallel. The control logic module can assign a same task to both ear-level processing devices, each task running with different input data. An example of such a scheme is a True Wireless Stereo system, where the control logic module may select a hearing loss compensation task to be performed on both processing devices in parallel. Each device processes its own audio input, and produces its own compensated audio output.

In another embodiment a user with big hearing loss could need amplifications that exceed the precision requirements of those implemented in the fixed-point processing means of the ear-level processing device. However, the smartphone, being capable of floating-point processing means, can adapt its dynamic range to provide the required gain. This means running the algorithm to apply the gains in the in-ear processing device may not be possible, thus leaving just one option for processing, namely the smartphone with said floating point processing means.

This example is an illustration of the difference in hardware capabilities of the processing devices comprised in the system. As already mentioned, when deciding on the actual implementation for carrying out an algorithm requirement can be taken into account that relate to the available capabilities in terms of hardware. As in the above example, some processing devices may be arranged to deal with floating point data types to represent signal values, wherein other devices only dispose of fixed-point processing means which are not able to deal with computationally more demanding operations with floating point representations.

In one embodiment, in a processing device adapted for fixed point processing an approach is adopted that allows for large dynamic range and gain characteristics, without sacrificing signal-to-noise ratios in cases where the gain is small. In a system comprising an ear level computing device used in a hearing aid application, this allows guaranteeing high quality audio without compromising the ability to apply high amounts of gain, which is common in the field of hearing loss compensation. This allows the control logic module to extend its set of implementations to choose from with more options and has obvious advantages, as it simplifies the use of fixed-point audio processing and allows one algorithm implementation to cover a bigger range of gains without sacrificing signal-to-noise ratios (especially for mild gains in the ear level computing device).

In implementations wherein a fixed-point processing device is used, not only the dynamic range can be maximized, but further also overflow can be avoided. In fixed point arithmetic the format to the represent signal values is chosen by the designer of the algorithm to be processed. This is usually expressed in terms of the number of bits used for the fractional part and the number of bits used for the integer part. Signal processing in the digital domain often uses a normalization that uses the range [−1, 1] of possible values as the "normal" range of values a signal can have. Values outside this range are considered not to be candidates for an output to a digital-to-analog converter.

In fixed point arithmetic only one range of values can be represented. An example of a 16 bit integer fixed point representation is considered with 1 sign bit and 15 bits for the fractional part. Numbers beyond the range [−1, 1[(or]− 1,1]) clearly cannot be represented using this schema. However, leaving one bit for the integer part, one can represent values up to the range [−2, 2[, two bits would lead to [−4, 4[, and so on. When values go beyond the maximum possible value the chosen representation can represent, this is called an overflow. When having processing steps, e.g. audio processing, that amplify the signal, the designer often has the challenge to handle (even if intermediate) values that are outside of the "normal" [−1, 1[range. This is why in most cases a fixed-point representation is adopted that leaves some bits for the integer part, so that processing does not lead to an overflow. However, the more bits are left for the integer part, the less bits that are left for the fractional part, so creating a trade-off between overflow safety and signal quality.

The example of a 16-bit representation is again considered. Its maximum dynamic range (i.e. the difference between the smallest and the biggest value it can represent) is given by the expression 20*log(1/2"), which for n=16 bits leads to a dynamic range value of 96 dB. If one chooses to have 10 bits for the fractional part, the dynamic range of the signal is effectively reduced to around 60 dB, leaving some 30 dB of upper room.

However, when processing, for example, for hearing loss compensation, one is often faced with gains substantially bigger than the average signal processing. In a traditional fixed-point approach, one would need to adjust the fractional part so that the integer part can accommodate all the possible gains (plus some headroom for transients) without overflowing. This then results in poor signal quality (unused bits) when the required amplification levels are not in such range.

A solution is presented that avoids the need to reserve too many bits for the integer part, thus maximizing fractional part dynamic range, while maintaining integrity of the signal by avoiding overflows for large gains. This involves a gain normalization step. In a system where the signal needs to be shaped in frequency, one subtracts its maximum gain value so that the applied gain shape is always negative. A brickwall limiter is then used designed to limit the signal at a given negative threshold. Such threshold is set by that maximum gain value. After limiting the signal to said value, one is guaranteed to be under the maximum value. It is then safe to apply the maximum value back to the signal thus bringing the signal back to its intended level. For example, a hearing loss compensation step may involve providing a set of [0, 5, 15, 20] dB of gain to the [125, 250, 1K, 4 k] frequencies. The maximum value (20 dB) is selected and subtracted it from the gain step. This results in a gain step of [−20, −15, −5, 0] dB. A limiter is then set to hard limit the signal at −20 dB, thus ensuring the output is never greater. A final step involves adding 20 dB of gain to the signal. This guarantees overflow cannot occur.

This approach offers the advantage of not having to lose dynamic range unnecessarily. When applying large gains, the algorithm brings the signal down first (thus reducing the dynamic range) by the gain normalization step. When applying not so large gains, the dynamic range reduction performed by this algorithm will be lower. It is then a way to maximize dynamic range for a wide variety of processing scenarios, while processing in fixed point arithmetic.

Alternatively, the fixed-point implementation in the in-ear processing device is such that gains applied are always negative. This allows using all the numerical space without risk of overflow. This approach is very advantageous where a large range of gains need to be applied, but the algorithm needs to be implemented in fixed point and with optimal signal-to-noise ratios. By adding a further processing block that makes up the gain, the algorithm is able to determine theoretically the maximum gain it can apply before overflow. This allows extending the viability of the algorithm where in the last paragraph wasn't viable. One example is processing with 32 bit arithmetic. One can safely choose to use all 32 bits of space for the calculation, instead of leaving some bits for integer part that would be required to prevent arithmetic overflow.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
a plurality of processing devices arranged for performing an algorithm comprising a plurality of computational tasks, said plurality of processing devices being interconnected with each other,
a control logic module adapted to select an implementation of said algorithm among a plurality of implementations,
wherein at least a part of said control logic module resides in one of said processing devices and
wherein said implementation is selected according to hardware capabilities of the system, allowing a choice between an implementation of said algorithm using signal values in a floating-point representation and an implementation of said algorithm using signal values in a fixed-point representation, and wherein in the selected implementation said plurality of computational tasks of said algorithm is distributed over at least two of said processing devices.

2. The system as in claim 1, wherein one of said processing devices is an ear-level audio processing device and another of said processing devices is a further portable computing device or a cloud computing service.

3. The system as in claim 2, wherein said ear level audio processing device is arranged for noise monitoring and/or sound generation.

4. The system as in claim 2, wherein said ear-level audio processing device is a hearing aid.

5. The system as in claim 1, wherein said control logic module is distributed over said plurality of processing devices.

6. The system as in claim 1, wherein at least one of said processing devices comprises a graphical user interface.

7. The system as in claim 1, wherein output produced by performing a computational task of said plurality of computational tasks in a first processing device can be received as input data in at least two other processing devices of said plurality of processing devices.

8. The system as in claim 1, wherein said control logic module can assign a computational task of said algorithm simultaneously to at least two different processing devices of said plurality.

9. The system as in claim 1, wherein said control logic module is arranged to steer a data stream in or to processing devices of said system by using a command from a set of commands.

10. The system as in claim 1, wherein selecting said implementation is performed on the fly.

11. The system as in claim 1, wherein in said implementation with said fixed point representation numbers representing a gain to be applied to signal values are normalized by subtracting a maximum gain value from said gain and limiting said signal values to a given negative threshold.

12. The system as in claim 11, wherein said given negative threshold equals the negative of said maximum gain value.

13. The system as in claim 1, wherein further at least one criterion of (privacy requirements, precision requirements, distance), is taken into account when selecting the implementation.

14. The system as in claim 13, wherein selecting said implementation is performed based on a weighted sum of two or more of said criteria.

15. The system as in claim 14, wherein weights of said weighted sum are determined by interrogating one or more of said processing devices.

\* \* \* \* \*